United States Patent Office 3,096,147
Patented July 2, 1963

3,096,147
PROCESS FOR INHIBITING CORROSION IN ACID SOLUTIONS WITH GUANAMINE-PROPYLENE OXIDE CONDENSATION PRODUCT
Richard W. Fulmer, Minneapolis, Minn., assignor to General Mills, Inc., a corporation of Delaware
No Drawing. Filed Oct. 6, 1960, Ser. No. 60,808
4 Claims. (Cl. 21—2.7)

This invention relates to a process for the prevention of corrosion.

Corrosion of metallic substances represents a major industrial problem. In general, this corrosion takes place when metallic surfaces, particularly ferrous-containing metals, come in contact with watery media, i.e., water, aqueous solutions, water vapor, and the like. In the operation of steam plants, one of the long standing problems has been the corrosion in steam condensate return lines and heat exchangers. It has been theorized that this corrosion is initiated by dissolved gases in the steam condensate. One of the preventive methods which has been utilized comprises forming a mono-molecular layer on pipe walls imparted by a film-forming amine. A typical example of such an inhibitor is octadecyl amine acetate. A deficiency of this class of compounds is that they are not readily water soluble and therefore it is difficult to uniformly contact all parts of the system with such inhibitors. In this regard, the protection of steam lines may depend on the compounds having sufficient steam volatility such that adequate quantities of the inhibitors are entrained in the steam to prevent corrosion in the condensate return lines.

Further, hydrochloric acid and other mineral acids are used widely as cleaning agents. In the production of petroleum, for example, various acids are employed to clean equipment, producing formations and other similar uses. The problem is that while acids are effective cleaners for many purposes, they readily attack metals, particularly ferrous metals, causing the corrosion thereof.

It has now been discovered that the condensation products of a mono-substituted guanamine with an oxirane compound having 2 to 3 carbon atoms, are exceptionally efficient, water soluble, corrosion inhibitors. The structure of these compounds may be illustrated by the following equation illustrating the condensation of acetoguanamine with propylene oxide:

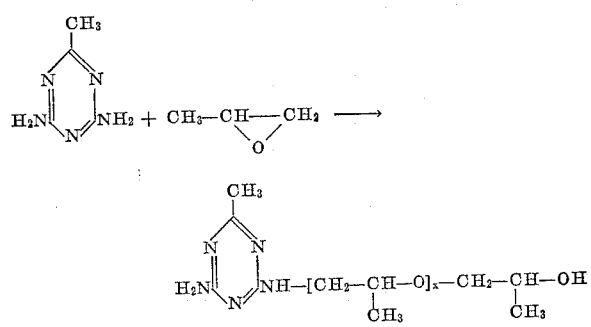

where $x$ varies between 0 and 10. Some of the propylene oxide also reacts with the other —$NH_2$ group, and it is believed that a mixture of products results in which from 1 to 4 active hydrogen atoms have reacted with the oxirane compound. The mixture need not be separated for the intended use as an inhibitor. Similar products are obtained when other guanamines are substituted for the acetoguanamine illustrated above. Specific examples of such compounds are stearylguanamine, benzoguanamine, toluoguanamine, butyl guanamine, lauroguanamine, β-ethoxypropioguanamine, β-methoxypropioguanamine, β-dimethylaminopropioguanamine, β-dodecylaminopropioguanamine, β-methylmercaptopropioguanamine, β-cyclohexyloxypropioguanamine, β-phenoxypropioguanamine, and β-(4-morpholino) propioguanamine. Other oxirane compounds can be substituted for the propylene oxide illustrated above including ethylene oxide and glycidol. Thus, the condensation products of monosubstituted guanamines having a 1 to 20 carbon atom substituent with an oxirane compound having 2 to 3 carbon atoms, are generally useful in the process of this invention. This class of compounds is well known. Their preparation and properties are disclosed in U.S. Letters Patent 2,381,121, granted Aug. 7, 1945, to Walter P. Ericks. Still further details of the preparation of this class of compounds are illustrated in the examples.

Generally, concentration in the range of 1 to 1000 parts per million in the liquid are preferred. Where corrosion conditions are extremely mild, lesser amounts are advantageously employed. Under extremely severe corrosion conditions, better results are often obtained when larger amounts of inhibitors are used. Thus, the optimum amount of inhibitor is best determined by trial or simulated tests.

Because the present compounds have improved water solubility, they may be added directly to the system to be protected. Generally, it is preferred, however, to add the compounds as a solution. Water or other suitable solvents are employed for this purpose.

The invention will be better understood with respect to the following examples. Unless otherwise stated, all parts and percentages used herein are by weight.

EXAMPLE I

Into a 100 ml. stirred flask was weighed 16 g. of stearoguanamine and 23 g. of glycidol. This reaction mixture was heated until an exothermic reaction began at about 120° C. After about 10 minutes the temperature, which had been at 135–145° C. during the exothermic reaction, began to decrease. Heat was reapplied to the flask and the temperature was held constant at 140° C. for an additional 10 minutes. The resultant amber resin was readily soluble in hot water.

Mild steel coupons having an average weight of 7.4825 g. were placed in 150 ml. of aqueous 5% hydrochloric acid solution containing 250 p.p.m. of the resin prepared above. After 6 hours at 70° C. the coupons were removed from the solution, cleaned, and reweighed. The average weight loss per coupon was calculated as 0.0747 g. As a control, similar coupons were immersed in an aqueous 5% hydrochloric acid solution containing no inhibitor. The average weight loss for these coupons was 1.7970 g. The percent inhibition which is calculated by dividing the difference in weight loss of the control coupons and the test coupons by the weight loss of the control coupons, was found to be 95.8%.

In order to test the utility of the resin for the prevention of corrosion in relatively pure aqueous media such a steam condensate, mild steel coupons similar to those used above were placed in 250 ml. of distilled water containing 2000 p.p.m. of the resin prepared above. After seven days at room temperature, the coupons were reweighed and the weight loss determined. Controls were also run and the percent inhibition calculated by the method set forth above is 41%. Comparable results are obtained with octadecyl amine acetate in this system.

EXAMPLES II–VI

Example I was repeated substituting for the stearoguanamine and glycidol, the pairs of reactants shown in Table I.

Table I

| Example | Guanamine Compound | Oxirane Compound |
|---|---|---|
| II | Stearoguanamine | Ethylene oxide. |
| III | Adipodiguanamine | Propylene oxide. |
| IV | Acetoguanamine | Do. |
| V | Lauroguanamine | Glycidol. |
| VI | Benzoguanamine | Do. |

Resins prepared from the condensation of each of these pairs of reactants were tested for mineral acid corrosion inhibition activity by the method of Example I and were found to give the similar results as the resin of Example I within experimental error of the test. The resins were also tested for inhibition in water as in Example I and were found to give results similar to Example I within the experimental error of the test.

The foregoing examples are included to illustrate preferred embodiments of the invention and are not to be interpreted as limitations on the scope thereof.

The process of the present invention is useful in prevention of corrosion in aqueous systems.

The embodiments of the present invention in which an exclusive property or privilege is claimed are defined as follows:

1. A process for corrosion inhibition of metallic substances intimately contacted by aqueous media which comprises adding to said aqueous media a corrosion inhibitor comprising a condensation product of an oxirane compound having 2 to 3 carbon atoms with a substituted guanamine having a monovalent aliphatic substituent having 1 to 20 carbon atoms.

2. The process of claim 1 wherein the corrosion inhibitor is the condensation product of stearoguanamine and glycidol.

3. The process of claim 1 wherein the aqueous media contains amounts of a mineral acid.

4. The process of claim 3 wherein the corrosion inhibitor is the condensation product of stearoguanamine and glycidol.

References Cited in the file of this patent

UNITED STATES PATENTS

| | | |
|---|---|---|
| Re. 23,227 | Blair et al. | May 9, 1950 |
| 2,381,121 | Ericks et al. | Aug. 7, 1945 |
| 2,582,138 | Lane et al. | Jan. 8, 1952 |
| 2,598,213 | Blair et al. | May 27, 1952 |
| 2,899,406 | De Benneville et al. | Aug. 11, 1959 |